US011843546B1

(12) United States Patent
Rule et al.

(10) Patent No.: US 11,843,546 B1
(45) Date of Patent: Dec. 12, 2023

(54) DETERMINING RESOURCE USAGE METRICS FOR CLOUD COMPUTING SYSTEMS

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/155,119

(22) Filed: Jan. 17, 2023

(51) Int. Cl.
*H04L 47/78* (2022.01)
*H04L 47/70* (2022.01)
*H04L 47/26* (2022.01)

(52) U.S. Cl.
CPC .......... *H04L 47/781* (2013.01); *H04L 47/822* (2013.01); *H04L 47/827* (2013.01); *H04L 47/26* (2013.01)

(58) Field of Classification Search
CPC ..... H04L 47/26; H04L 47/781; H04L 47/822; H04L 47/827
See application file for complete search history.

(56) References Cited

U.S. PATENT DOCUMENTS

| | | | | |
|---|---|---|---|---|
| 10,110,506 B2 * | 10/2018 | Kasso | .................. | H04L 47/745 |
| 10,154,101 B2 * | 12/2018 | Achtner | ................ | H04W 4/021 |
| 10,255,112 B2 * | 4/2019 | Boss | ..................... | G06F 9/5011 |
| 10,452,441 B1 * | 10/2019 | Subramanian | ........ | G06F 40/279 |
| 10,891,666 B1 * | 1/2021 | Sirota | ................ | G06Q 30/0283 |
| 11,036,554 B1 * | 6/2021 | Prock | .................. | G06F 9/45558 |
| 11,044,257 B1 * | 6/2021 | Heuts | ................... | H04L 63/108 |
| 11,416,306 B1 * | 8/2022 | Gussin | .................. | H04L 41/147 |
| 11,588,748 B1 * | 2/2023 | Dehenre | ................. | H04L 47/72 |
| 11,616,686 B1 * | 3/2023 | Chandrachood | .... | H04L 41/0803 709/220 |
| 2008/0244576 A1 * | 10/2008 | Kwon | ................... | G06F 9/5016 718/1 |
| 2009/0006247 A1 * | 1/2009 | Hansen | ................. | G06Q 30/02 707/999.107 |
| 2011/0213712 A1 * | 9/2011 | Hadar | .................... | G06Q 30/04 705/34 |

(Continued)

FOREIGN PATENT DOCUMENTS

| | | | |
|---|---|---|---|
| CN | 114297256 A * | 4/2022 | |
| EP | 2822307 A1 * | 1/2015 | ......... H04L 12/1403 |

(Continued)

*Primary Examiner* — Shean Tokuta
(74) *Attorney, Agent, or Firm* — Perkins Coie LLP

(57) ABSTRACT

Methods and systems are described herein for determining resource usage metrics of cloud computing systems. The system may generate access tokens for an account associated with a certain resource class of resources. The system may receive requests comprising a corresponding access token request and a corresponding resource class identifier. The system may determine the corresponding resource class for each request. The system may generate aggregated resource data based on a corresponding quantity of each resource within the resource class and may determine, based on the aggregated resource data, a resource usage metric indicating a total amount of resources used by the cloud computing system.

20 Claims, 7 Drawing Sheets

(56) References Cited

U.S. PATENT DOCUMENTS

| | | | | |
|---|---|---|---|---|
| 2013/0097601 A1* | 4/2013 | Podvratnik | ............ | G06F 9/5077 |
| | | | | 718/1 |
| 2013/0132561 A1* | 5/2013 | Pasala | ................. | H04L 67/1097 |
| | | | | 709/224 |
| 2017/0054726 A1* | 2/2017 | Friedmann | ......... | G06Q 30/0283 |
| 2017/0357651 A1* | 12/2017 | He | .......................... | H04W 4/21 |
| 2018/0095798 A1* | 4/2018 | Kluck | ................... | G06F 9/5027 |
| 2018/0197161 A1* | 7/2018 | Kuzkin | ................ | G06Q 20/145 |
| 2018/0232786 A1* | 8/2018 | Kuzkin | ............... | G06Q 20/0855 |
| 2018/0255040 A1* | 9/2018 | Chennuri | .............. | H04L 63/102 |
| 2019/0149627 A1* | 5/2019 | Zhuang | ................ | G06Q 10/063 |
| | | | | 709/224 |
| 2019/0349210 A1* | 11/2019 | Nayak | .................... | H04M 15/58 |
| 2020/0267153 A1* | 8/2020 | Kang | ....................... | H04L 63/10 |
| 2022/0417175 A1* | 12/2022 | Lemberg | ................ | H04L 47/125 |
| 2023/0185617 A1* | 6/2023 | Moghaizel | ........... | G06F 11/3495 |
| | | | | 718/104 |

FOREIGN PATENT DOCUMENTS

| | | | | |
|---|---|---|---|---|
| JP | 2005031776 A | * | 2/2005 | .......... G06F 11/3423 |
| JP | 2015529367 A | * | 10/2015 | |
| WO | WO-2018019069 A1 | * | 2/2018 | ............. H04L 29/06 |
| WO | WO-2021205204 A1 | * | 10/2021 | ........ G06F 9/45558 |
| WO | WO-2022098405 A1 | * | 5/2022 | ............ H04W 12/08 |
| WO | WO-2022110404 A1 | * | 6/2022 | ............ G06F 21/64 |

* cited by examiner

200

| Sub-accounts 203 | Access Tokens 206 | Resource Classes 208 |
|---|---|---|
| <account_1> | <access_token_1> | <res_class_1> |
| <account_2> | <access_token_2> | <res_class_2> |
| <account_3> | <access_token_3> | <res_class_3> |
| <account_4> | <access_token_4> | <res_class_4> |
| <account_5> | <access_token_5> | <res_class_5> |

| Resource Classes | Resources |
|---|---|
| <res_class_1> | <resource_1a><br><resource_1b><br><resource_1c> |
| <res_class_2> | <resource_2a> |
| <res_class_3> | <resource_3a><br><resource_3b> |
| <res_class_4> | <resource_4a><br><resource_4b> |
| <res_class_5> | <resource_5a><br><resource_5b><br><resource_5c><br><resource_5d> |

303 — Resource Classes
306 — Resources

FIG. 3

| Request 1 | Request 2 | Request 3 |
|---|---|---|
| quantity(<resource_1a>)<br>quantity(<resource_1c>) | quantity(<resource_3b>) | quantity(<resource_5a>)<br>quantity(<resource_5c>)<br>quantity(<resource_5d>) |
| <account_1> | <account_3> | <account_5> |
| SKU 1 | SKU 3 | SKU 5 |

FIG. 4

DETERMINING RESOURCE USAGE METRICS FOR CLOUD COMPUTING SYSTEMS

BACKGROUND

Cloud computing systems—the delivery of computing services over the internet-offer flexibility, scalability, mobility, and other benefits as compared to traditional computing systems. However, adapting processes for cloud computing faces several technical challenges. For example, resource availability may fluctuate due to internet connections and outages, and demand for resources may fluctuate due to the activities of other users around the world. For example, a computing device may attempt to use a cloud computing system to process a request using a certain amount of resources. However, a much larger amount of resources may be required at the time of processing due to fluctuations in availability and demand of the resources. This unpredictability causes difficulty in adapting systems for cloud computing.

SUMMARY

Methods and systems are described herein for novel uses and/or improvements to cloud computing systems applications. As one example, methods and systems are described herein for determination of resource usage metrics for cloud computing systems.

To overcome the technical deficiencies of cloud computing, methods and systems disclosed herein determine resource usage metrics for cloud computing systems. For example, a cloud computing system may generate access tokens for an account corresponding to a particular process run on the cloud computing system. Access tokens may be used in cloud computing systems in various ways, including authentication, authorization, or information exchange. For example, when a computing device attempts to utilize a cloud computing system to process a request, a token may be returned and used to authenticate the computing device. After a request has been authenticated, an application may request to access resources on behalf of that computing device. To do so, the token may be exchanged. The account may correspond to a particular resource class, or type of resources. Resource classes may include servers, processors, storage, databases, networks, memory, power, applications, or other resource types, and each resource class may include multiple resources of the corresponding type.

The cloud computing system may receive requests from computing devices. The requests may include access token requests and corresponding resource class identifiers. For example, each request may attempt to access a certain resource within the cloud computing system, and the cloud computing system may determine the corresponding resource class for each request. The cloud computing system may grant resource access to each computing device based on the request received from that computing device. Based on a quantity of each resource requested, the cloud computing system may aggregate the requested resources utilized by the account. Finally, the cloud computing system may determine, based on the aggregated resources, a resource usage metric indicating a total number of resources used by the cloud computing system for the account.

In particular, the system may generate a plurality of access tokens for an account. The account may correspond to a particular application running on the cloud computing system and may be associated with a plurality of cloud computing resource classes. Each resource class may include a plurality of resources. For example, a resource class for processors may include multiple processors or multiple types of processors. In some embodiments, the system may generate the access tokens by retrieving an account identifier associated with the account, determining a number of resource classes within the plurality of requests, generating a plurality of sub-accounts equal to the number of the resource classes, and generating a token for each account of the plurality of sub-accounts. The sub-accounts may correspond to various components associated with the account, such as various processing steps or various requests, that each require a resource.

In some embodiments, the cloud computing system may bind the plurality of access tokens to the plurality of cloud computing resource classes. In some embodiments, binding the plurality of access tokens to the plurality of resource classes may include assigning the plurality of access tokens to a plurality of sub-accounts associated with the account. For example, each sub-account may be associated with a resource class. In some embodiments, binding a token with a cloud computing resource class may include providing permission to exchange information regarding the cloud computing resource class using the token. Binding the token with the cloud computing resource class may prevent information exchange, regarding other cloud computing resource classes, using the token.

The cloud computing system may receive a plurality of requests. In some embodiments, the cloud computing system may receive the requests from one or more remote computing devices. Each request may include a corresponding access token request and a corresponding resource class identifier. For example, the access token request may be a request for an access token corresponding to a resource class identifier for a required resource.

The cloud computing system may determine, for each request based on the corresponding resource class identifier, the corresponding resource class. The cloud computing system may then transmit, according to the corresponding resource class, an access token response to the remote computing device, confirming authentication of the remote computing device. In some embodiments, the cloud computing system may identify a sub-account corresponding to the access tokens associated with the access token request and may access the access tokens associated with the sub-account.

The cloud computing system may generate aggregated resource data based on a corresponding quantity of each resource. For example, based on the resources requested, the system may determine a quantity of resources required by the account. The system may use the aggregated resource data to determine a resource usage metric. The resource usage metric may indicate a total amount of resources required. For example, the resource usage metric may indicate a total amount of every resource required by the cloud computing system to process the requests for the account. The resource usage metric may include a certain amount of processing power with particular processors, a particular network, a certain amount of storage, or any other resources required to process the requests for the account at that particular time. In some embodiments, the cloud computing system may output the resource usage metric.

Various other aspects, features, and advantages of the invention will be apparent through the detailed description of the invention and the drawings attached hereto. It is also to be understood that both the foregoing general description and the following detailed description are examples and are

BRIEF DESCRIPTION OF THE DRAWINGS

FIG. 2 illustrates a data structure storing sub-account identifiers, access token identifiers, and resource class identifiers, in accordance with one or more embodiments.

FIG. 3. illustrates a data structure storing resource class identifiers and resource identifiers, in accordance with one or more embodiments.

FIG. 4 illustrates a data structure storing requests received by a cloud computing system, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
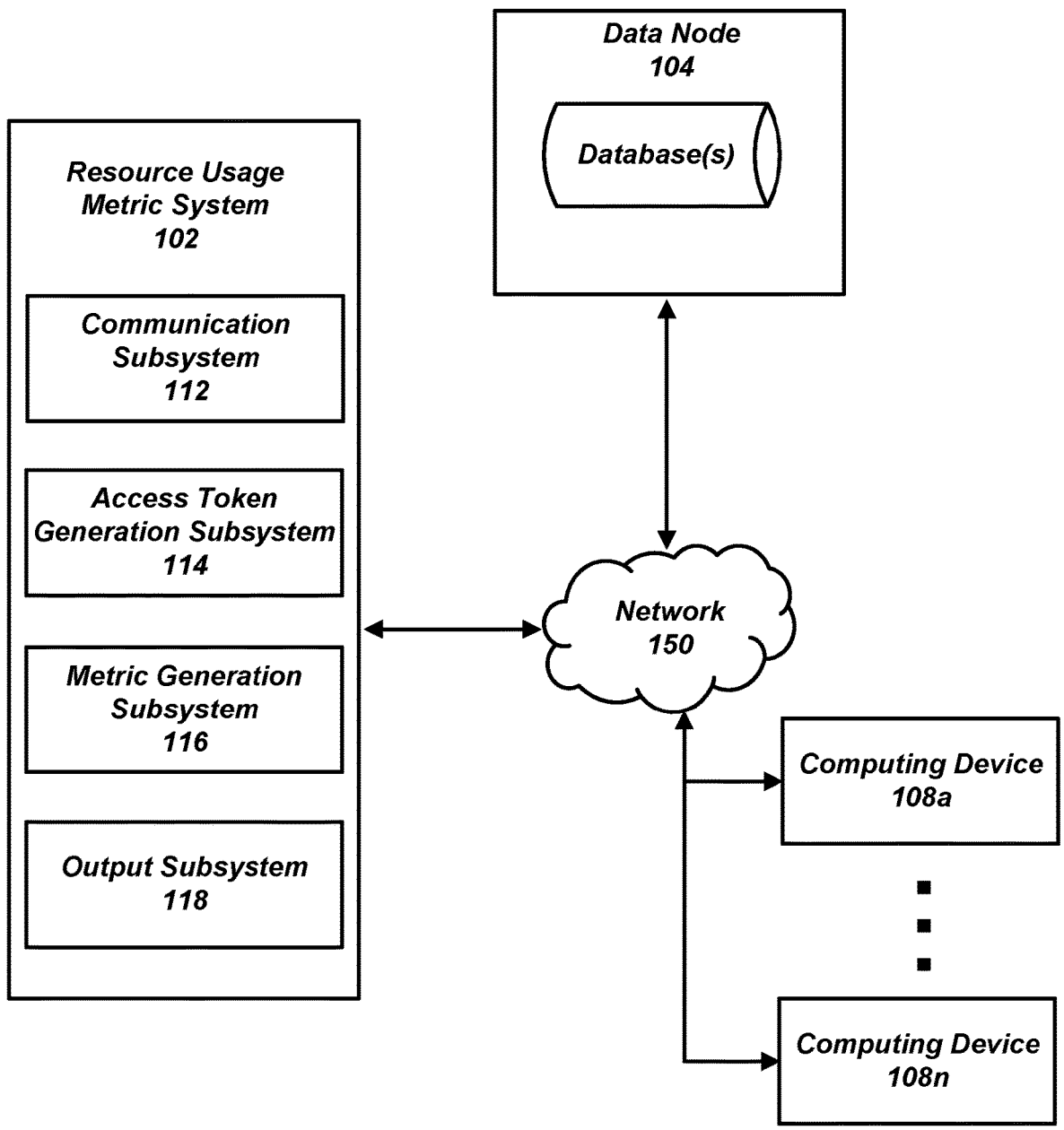
FIG. 1 shows an illustrative system for determining resource usage metrics for cloud computing systems, in accordance with one or more embodiments.

FIG. 1 shows an illustrative system 100 for determining resource usage metrics for cloud computing systems, in accordance with one or more embodiments. System 100 includes resource usage metric system 102, data node 104, and computing devices 108a-108n. In some embodiments, only one computing device may be used while in other embodiments multiple computing devices may be used. The computing devices 108a-108n may be associated with one or more users. In some embodiments, computing devices 108a-108n may be remote computing devices that may receive and send data via network 150. Each computing device 108 may include any type of mobile terminal, fixed terminal, or other device. By way of example, computing device 108 may include a desktop computer, a notebook computer, a tablet computer, a smartphone, a wearable device, or other client device. Users may, for instance, utilize one or more of computing devices 108a-108n to interact with one another, one or more servers, or other components of system 100. It should be noted that, while one or more operations are described herein as being performed by particular components of resource usage metric system 102, those operations may, in some embodiments, be performed by other components of resource usage metric system 102 or other components of system 100. As an example, while one or more operations are described herein as being performed by components of resource usage metric system 102, those operations may, in some embodiments, be performed by components of computing devices 108a-108n.

Resource usage metric system 102 may execute instructions for determining resource usage metrics for cloud computing systems. Resource usage metric system 102 may include software, hardware, or a combination of the two. For example, resource usage metric system 102 may be a physical server or a virtual server that is running on a physical computer system. In some embodiments, resource usage metric system 102 may be configured on a user device (e.g., a laptop computer, a smart phone, a desktop computer, an electronic tablet, or another suitable user device).

Data node 104 may store various data, including access tokens, account information, resource class information, resource information, requests, aggregated resource data, resource usage metrics, and/or other suitable data. Data node 104 may include software, hardware, or a combination of the two. For example, data node 104 may be a physical server, or a virtual server that is running on a physical computer system. In some embodiments, resource usage metric system 102 and data node 104 may reside on the same hardware and/or the same virtual server/computing device. Network 150 may be a local area network, a wide area network (e.g., the Internet), or a combination of the two.

In some embodiments, resource usage metric system 102 may generate (e.g., via access token generation subsystem 114) a plurality of access tokens. Access tokens (e.g., web tokens) may be used in cloud computing systems in various ways, including authentication, authorization, or information exchange. For example, when a computing device attempts to utilize a cloud computing system to process a request, a token may be returned and used to authenticate the computing device. After a request has been authenticated, an application may request to access resources on behalf of that computing device. To do so, the token may be exchanged. In one example, the access tokens may authenticate remote computing devices attempting to use resources via the cloud computing system. For example, the access tokens may be exchanged between resource usage metric system 102 (e.g., using communication subsystem 112) and computing devices for one or more resources belonging to one or more resource classes.

Resource usage metric system 102 (e.g., access token generation subsystem 114) may generate the plurality of access tokens for an account. In some embodiments, the account may correspond to a particular application running on the cloud computing system. In some embodiments, the account may correspond to a product being produced. In some embodiments, the account may correspond to another procedure. In some embodiments, the account may be associated with a user, program, product, or other entity interacting with the cloud computing system. In some embodiments, the account may be a financial account, a personal account, or some other type of account. The account may include a number of sub-accounts. For example, sub-accounts may be accounts relating to a main account. Sub-accounts may each correspond to a particular component of the main application running on the cloud computing system. For example, if the account corresponds to the main application, each sub-account may correspond to a particular element, process, or other component of the application. Sub-accounts may each correspond to a particular component of a product being produced. For example, if the account corresponds to the final product, each sub-account may correspond to a piece or component of the final product. In some embodiments, the sub-accounts may be virtual numbers (e.g., such as virtual card numbers) tied to the account. In some embodiments, sub-accounts may correspond to other elements of the account.

In some embodiments, the account may correspond to a particular resource class, or type of resources. For example, resource classes may include servers, processors, storage, databases, networks, memory, power, applications, or other resource types, and each resource class may include multiple resources of the corresponding type. For example, the server resource class may include multiple resources which are different types of servers, such as a web server, a DNS server, a database server, an email server, and other types of servers. In some embodiments, the different resources within the server resource class may be different servers of the same type, such as a first web server, a second web server, and so on. In some embodiments, resource classes may include physical components of a particular product being produced. For example, resource classes may include circuit boards, batteries, casing, wiring, and other physical components of a product. In this example, resources within each resource class may be variations of the physical component of that class. For example, resources within the battery resource class may include different types and brands of batteries.

To generate the access tokens, access token generation subsystem 114 may first retrieve an account identifier associated with the account. For example, an account identifier may be a name, title, label, pointer, or other identifier of an account. The account may correspond to a particular process run on the cloud computing system. Access token generation subsystem 114 may then determine a number of resource classes within the plurality of requests. For example, each request may include a resource class identifier. Access token generation subsystem 114 may thus determine a number of resource class identifiers included within a plurality of requests received by resource usage metric system 102 (e.g., via communication subsystem 112). Access token generation subsystem 114 may then generate a plurality of sub-accounts equal to the number of the resource classes. Finally, access token generation subsystem 114 may generate a token for each sub-account of the plurality of sub-accounts.

In some embodiments, access token generation subsystem 114 may bind the plurality of access tokens to the plurality of cloud computing resource classes. For example, binding the access tokens to the resource classes may include assigning the plurality of access tokens to the plurality of sub-accounts associated with the account. As discussed above, each sub-account may be associated with a resource class.

FIG. 2 illustrates a data structure 200 storing sub-account identifiers, access token identifiers, and resource class identifiers, in accordance with one or more embodiments. Data structure 200 may identify sub-accounts 203, access tokens 206, and resource classes 208. In some embodiments, data structure 200 may include pointers to sub-accounts 203, access tokens 206, and resource classes 208 (e.g., where they are stored within the system). As shown in data structure 200, each sub-account of sub-account 203 may be associated with an access token of access tokens 206 and a resource class of resource classes 208. For example, as discussed above, access token generation subsystem 114 may bind each access token to a corresponding resource class, which is in turn associated with a corresponding sub-account. Thus, data structure 200 may store these relationships. In some embodiments, data structure 200 may additionally include pointers to other data structures. For example, resource classes 208 may include a pointer to another table (e.g., discussed below in relation to FIG. 3) storing resource class identifiers and corresponding resource identifiers.

FIG. 3 illustrates a data structure 300 storing resource class identifiers and resource identifiers, in accordance with one or more embodiments. Data structure 300 may include resource classes 303 and resources 306. In some embodiments, resource classes 303 may correspond to resource classes 208, as shown in FIG. 2. In some embodiments, certain resource classes (e.g., <res_class_2>) may include a single resource (e.g., <resource_2a>). For example, a resource class such as a network resource class may include a single network. In some embodiments, certain resource classes (e.g., <res_class_1>, <res_class_3>, <res_class_4>, and <res_class_5>) may each include multiple resources. For example, <res_class_1> may be a resource class for processors, and it may include multiple processors (e.g., <resource_1a>, <resource_1b>, and <resource_1c>) of different types or of the same type.

In one example, an account may be a financial account associated with a particular product being produced. A number of sub-accounts (e.g., sub-accounts 203, as shown in FIG. 2) may be created within the account, with each sub-account corresponding to a particular type of resource (e.g., resource classes 208, as shown in FIG. 2, and resource classes 303, as shown in FIG. 3) used to produce the product. The sub-accounts may be identified by virtual card numbers or other identifiers. In some embodiments, there may be sub-accounts for circuit boards, batteries, casing, wiring, and other physical components of the product. Each resource class may include one or more resources (e.g., resources 306, as shown in FIG. 3) of the resource type. For example, the battery resource class may include various types of batteries, such as batteries with various voltages, different brands of batteries, rechargeable and single-use batteries, and other variations of batteries. When a supplier contributes a resource to the production of the product, the supplier may request to charge the sub-account corresponding to the resource class to which the resource belongs. For example, a battery supplier may charge the sub-account for batteries upon contributing a particular battery to the production of the product. The request may include an identifier of the corresponding resource class (e.g., batteries) and an access token request (e.g., authentication information for the seller, such as a virtual card number corresponding to the sub-account). The supplier may receive, in response, a response confirming payment or otherwise acknowledging the charge. A final price of the product (e.g., resource usage metric) may be determined based on an aggregation of all product components charged to the sub-accounts for the product.

Returning to FIG. 1, resource usage metric system 102 may receive (e.g., via communication subsystem 112) a plurality of requests. For example, the requests may be received from one or more remote computing devices (e.g., computing devices 108a-108n). In some embodiments, each request may include an access token request and a cloud computing resource class identifier. For example, communication subsystem 112 may receive a request from computing device 108a, which is attempting to run a program on the cloud computing system. The request may include an access token request for accessing one or more resources required to run the program on the cloud computing system, as well as one or more resource class identifiers corresponding to the required resources. The access token request may include authentication information associated with the remote computing device and/or the sub-account associated with the requested resource. Resource usage metric system 102 may determine one or more resource classes corresponding to the resource class identifiers in the request.

In response to receiving the requests, communication subsystem 112 may transmit a plurality of access token responses to the one or more remote computing devices (e.g., computing devices 108a-108n). For example, in response to receiving a request from computing device 108a, resource usage metric system 102 may transmit an access token response to computing device 108a. The access token response may include confirmation of authentication, confirmation of payment, acknowledgement of access, or some other response. In some embodiments, the access token response may indicate a denial of authentication, a denial of payment, a denial of access, or some other response. In some embodiments, a response indicating a denial may be based on a parameter of a requested resource violating a particular rule or threshold. For example, a computing device may request an amount of network bandwidth that is too high for a network to handle, and resource usage metric system 102 may therefore reject the request. In another example, a price of a particular component of a product may rise too high, and resource usage metric system 102 may deny the request.

Communication subsystem 112 may transmit the corresponding access token response to the appropriate computing device. After the request has been authenticated, an application may access resources on behalf of computing device 108a. In some embodiments, in response to receiving a request, resource usage metric system 102 may identify a sub-account associated with the access token request included in the request. Resource usage metric system 102 may then access the access tokens associated with the sub-account.

In some embodiments, resource usage metric system 102 may store requests. For example, resource usage metric system 102 may store information based on the received requests. Information based on the requests may include a quantity of each resource requested or used by each remote computing device, accounts or sub-accounts associated with each request, product or application identifiers associated with the accounts or sub-accounts, and other related information. In some embodiments, the product or application identifier may correspond to an application running on the cloud computing system or a product being produced. In some embodiments, additional information may be stored, such as information about the types of resources, availability of resources, costs associated with each resource, and other information. For cloud computing applications, this additional information may include available servers, types of processors, amount of memory, network bandwidth, and other relevant information. For products, additional information may include available components, variations of components (e.g., color, quality, costs, etc.), shipping times and costs, and other relevant information. Resource usage metric system 102 may store this information in data node 104.

In some embodiments, the information stored in data node 104 may be dynamic. In other words, it may be updated in real time based on fluctuations in availability of and demand on resources as well as external fluctuations (e.g., changes in shipping, manufacturing, or other related processes). In some embodiments, the requests may vary dynamically. For example, amounts of various required resources may change over time. An application running on a cloud computing system may require more resources when more users are using the application, when users are running certain components of the application, when the application is starting up, or in other scenarios. An application may require different resources when it is starting up than when it is running normally. An application's required resources may change over time due to updates or other changes to the application. These changes may cause the amounts and types of resources to fluctuate, and these fluctuations may be captured in the information stored in data node 104. In some embodiments, amounts of required resources for a product may change over time. For example, supply chain changes may affect shipping costs, component costs, labor costs, or other elements of a product. A component of the product may change in price based on how many of the components are purchased together. Economic changes may affect the pricing of elements of the products. The information stored in data node 104 may reflect the current pricing of product components at any given time.

FIG. 4 illustrates a data structure 400 storing requests received by a cloud computing system, in accordance with one or more embodiments. For example, data structure 400 may include a first request 403, a second request 406, and a third request 409. As shown in FIG. 4, each request may include a quantity of each requested resource, a sub-account for which each resource was requested, and a product or application identifier. In some embodiments, the resources included in data structure 400 may correspond to resources 306, as shown in FIG. 3. In some embodiments, data structure 400 may additionally store information related to the requests, such as dynamic details about the resources, as described above. In some embodiments, resource usage metric system 102 may update data structure 400 in real time as details about the resources change.

Resource usage metric system 102 (e.g., requirement generation subsystem 116) may aggregate the stored data (e.g., data stored in data structure 400). For example, metric generation subsystem 116 may aggregate the quantities of each requested resource. For cloud computing applications, metric generation subsystem 116 may aggregate the required processing power, memory, electricity, and network bandwidth to run the application on the cloud computing system. The aggregated resource data for a cloud computing application may include additional stored information such as types of servers, types of processors, types of memory, types of networks, and any other relevant information corresponding to the aggregated resources. For products, aggregated resource data may include a number of each component required to produce the product, as well as additional information such as color, quality, costs, and other factors associated with each component (e.g., shipping times and costs). In some embodiments, resource usage metric system 102 may store the aggregated resource data in data node 104 and may update the aggregated resource data in real time based on fluctuations in resource availability and demand or other factors.

In some embodiments, generating the aggregated resource data may include generating a data structure such as data structure 400, as shown in FIG. 4. For example, metric generation subsystem 116 may extract, from a number of requests received by communication subsystem 112, resource data relating to resources corresponding to each request. In some embodiments, the resource data may include amounts of each requested resource, characteristics of each requested resource, identifiers relating to each requested resource, a quality of each requested resource, accounts relating to each requested resource, and additional data relating to each requested resource. Metric generation subsystem 116 may generate a data structure including a plurality of entries, and each entry may include resource data corresponding to a request. For example, metric generation subsystem 116 may generate a data structure such as data structure 400 including a plurality of entries for the first request 403, the second request 406, and the third request 409, and so on. In some embodiments, data structure 400 may include additional fields for additional data extracted from the requests. Metric generation subsystem 116 may aggregate the entries within the data structure to generate the aggregated resource data.

Metric generation subsystem 116 may determine a resource usage metric based on the aggregated resource data. For example, the aggregated resource data may include a required quantity of each resource as well as information about each required resource. The resource usage metric may be a total amount of required resources based on the aggregated resource data. For example, the resource usage metric for a product may be a total price for all components of the product (e.g., components, shipping, manpower, etc.) made at a particular time. In some embodiments, the resource usage metric for a cloud computing application may be a price for the use of the total required resources. The resource usage metric for a cloud computing application may be a certain number of central processing units (CPUs) of processing power, a certain number of megabytes (MB) of memory, a certain number of megabits per second (Mbps) of networking bandwidth, and/or other resource requirements for the cloud computing system at that particular time. In some embodiments, the resource usage metric may be a certain amount of each resource (e.g., CPUs, MB, Mbps, etc.) required for the application to run, at a particular time, for each user (e.g., a vector of required resources per user). In other words, the resource usage metric may reflect a unit of each resource required per user.

Figure 5:
FIG. 5 illustrates a data structure storing resource identifiers and unit resources, in accordance with one or more embodiments.

FIG. 5 illustrates a data structure 500 storing resource identifiers and unit resources, in accordance with one or more embodiments. Data structure 500 may include resources 503 and unit resources 506. In some embodiments, resources 503 may correspond to resources 306, as shown in FIG. 3. Resources 503 may reflect resources required to run a cloud computing application at a particular time. In some embodiments, unit resources 506 may reflect the portion of the resources required to run the application at the particular time for each user, device, or other entity running the application. For example, if 100 CPUs of processing power are required to run an application at a particular time, and there are 100 users running the application at that time, each user requires 1 CPU to run the application. In another example, unit resources 506 may reflect a portion of the resources required to produce each product at the particular time. If shipping 10,000 particular components to a manufacturing facility costs $1,000 for a particular shipment, and 1 component is required per product, the unit resources 506 may include $0.10 in shipping costs for each component of that particular type.

In some embodiments, the metric generation subsystem 116 may aggregate the unit resources 506 and generate the resource usage metric based on the aggregation of unit resources 506. For example, the resource usage metric may reflect a total amount of each type of resource required for a cloud computing application at a particular time for each user. In some embodiments, the resource usage metric may reflect a total amount of each type of resource required to produce each product at a particular time.

Because the resource usage metric is based upon the aggregated resource requirement, which is updated in real time by the requirement generation subsystem 116, the resource usage metric reflects a current total of required resources. For example, the requested resources may fluctuate due to dynamic requirements of a cloud computing application (e.g., based on users, processes being run on the application, etc.). The resource usage metric may therefore reflect the resources requested by the application at any particular time. In some embodiments, availability of cloud computing resources, as well as external demand for those resources, may affect the resource usage metric. For example, a server outage may cause an application to request access to a different server, and the metric generation subsystem 116 may update the aggregated resource data and, in turn, the resource usage metric, to reflect the change. In another example, an application may request access to a certain network which does not currently have bandwidth, and the application may be required to utilize a different network. The metric generation subsystem 116 may update the aggregated resource data and the resource usage metric to reflect the shift.

In some embodiments, the plurality of resources within each resource class may include substitution resources. For example, any resource may be substituted for another. In some embodiments, one or more resources within the resource class may be a first, or primary, resource while the other resources may be substituted for the one or more first resources. In some embodiments, certain resources within the resource class may be substituted for certain other resources within the resource class.

In some embodiments, resources may be substituted for one another based on certain events. For example, resource usage metric system 102 may determine or receive a resource usage metric threshold. In some embodiments, the resource usage metric threshold may be a maximum for the resource usage metric. For example, the resource usage metric threshold may be a maximum amount of cloud computing resources that a single application may use at any given time. In some embodiments, the resource usage metric threshold may be a maximum price that a user or customer is willing to pay to run a cloud computing application at a given time. In some embodiments, the resource usage metric threshold may be a maximum price that a user or customer is willing to pay to purchase a product at a given time. In some embodiments, the resource usage metric threshold may represent a maximum based on other factors.

In some embodiments, once metric generation subsystem 116 determines a resource usage metric for a cloud computing application, metric generation subsystem 116 may compare the resource usage metric to the threshold. In response to determining that the resource usage metric exceeds the resource usage metric threshold, metric generation subsystem 116 may retrieve one or more substitution resource identifiers associated with the same resource class as a first resource being used by the cloud computing application. In some embodiments, metric generation subsystem 116 may identify one or more substitution resources that will lower the resource usage metric if substituted for the first resource. For example, metric generation subsystem 116 may identify substitution resources with a certain parameter that does not exceed a threshold value at that particular time. An amount, price, or other parameter of the first resource may determine the threshold value. As an example, the first resource may have a certain price, and metric generation subsystem 116 may identify one or more substitution resources having lower prices than the first resource (i.e., where the price of the first resource is the threshold value). Metric generation subsystem 116 may thus select one of the substitution resources having a parameter not exceeding the threshold value. Substituting one of the substitution resources for the first resource will thereby lower the overall resource usage metric.

In some embodiments, metric generation subsystem 116 may substitute the selected substitution resource for the first resource. In some embodiments, communication subsystem 112 may, in response to receiving a request associated with the first resource, transmit a response requesting a new request that includes an indication of the substitution resource. For example, a user may request the first resource from resource usage metric system 102. In response, communication subsystem 112 may respond to the user with a request that the user request the substitution resource from resource usage metric system 102. Communication subsystem 112 may include information about the resource usage metric exceeding the resource usage metric threshold, the substitution resource having a parameter not exceeding a threshold value, and any other relevant information.

As an example, metric generation subsystem 116 may determine that a resource usage metric for a cloud computing application is too high at a given time (i.e., it exceeds a resource usage metric threshold). For example, an application may be using more bandwidth than a particular network has available or a price of a product may be too high. In response, metric generation subsystem 116 may identify suitable substitution resources for one or more resources being used by the cloud computing application. For example, metric generation subsystem 116 may identify resources having less costly or more efficient substitutions available. Metric generation subsystem 116 may identify a network with more available bandwidth or a less costly substitution component for the product. In some embodiments, metric generation subsystem 116 may identify substitution resources that will lead to the highest overall decrease in the resource usage metric. In some embodiments, metric generation subsystem 116 may identify substitution resources that will cause the smallest change in performance or the shortest interruption to performance of the cloud computing application.

In some embodiments, metric generation subsystem 116 may substitute a resource with a substitution resource based on a determination that a particular parameter of the resource violates a threshold or rule. For example, a computing device may request an amount of network bandwidth that is too high for a network to handle, and resource usage metric system 102 may therefore reject the request. In another example, a price of a particular component of a product may rise too high, and resource usage metric system 102 may deny the request. Metric generation subsystem 116 may therefore determine substitution resources for replacing the resource. For example, metric generation subsystem 116 may identify substitution resources for which the particular parameter does not violate the threshold or rule.

Metric generation subsystem 116 may substitute one or more resources with the substitutions or output subsystem 118 may output the substitution options to a user or customer. For example, output subsystem 118 may output the resources with available substitutions, the available substitutions, and the consequences of making the identified substitutions. Communication subsystem 112 may receive, in response, feedback from a user or customer. The feedback may be a selection of one or more of the identified substitutions, input of alternative substitutions, an override input indicating that the resource usage metric is acceptable even though it exceeds the resource usage metric threshold, or some other feedback. In response to receiving the feedback, metric generation subsystem 116 may make any necessary adjustments to the resource usage metric.

In some embodiments, output subsystem 118 may output a final resource usage metric. For example, output subsystem 118 may output the final resource usage metric after any necessary substitutions have been made. Output subsystem 118 may output the final resource usage metric in the form of a price, a price per user, an amount of each required resource, an amount of each required resource per user, or some other form. Output subsystem 118 may output an indication that the resource usage metric is acceptable (i.e., it did not exceed a resource usage metric threshold). In some embodiments, output subsystem 118 may only output the resource usage metric if it is not acceptable (i.e., if it does exceed a resource usage metric threshold).

Computing Environment

Figure 6:
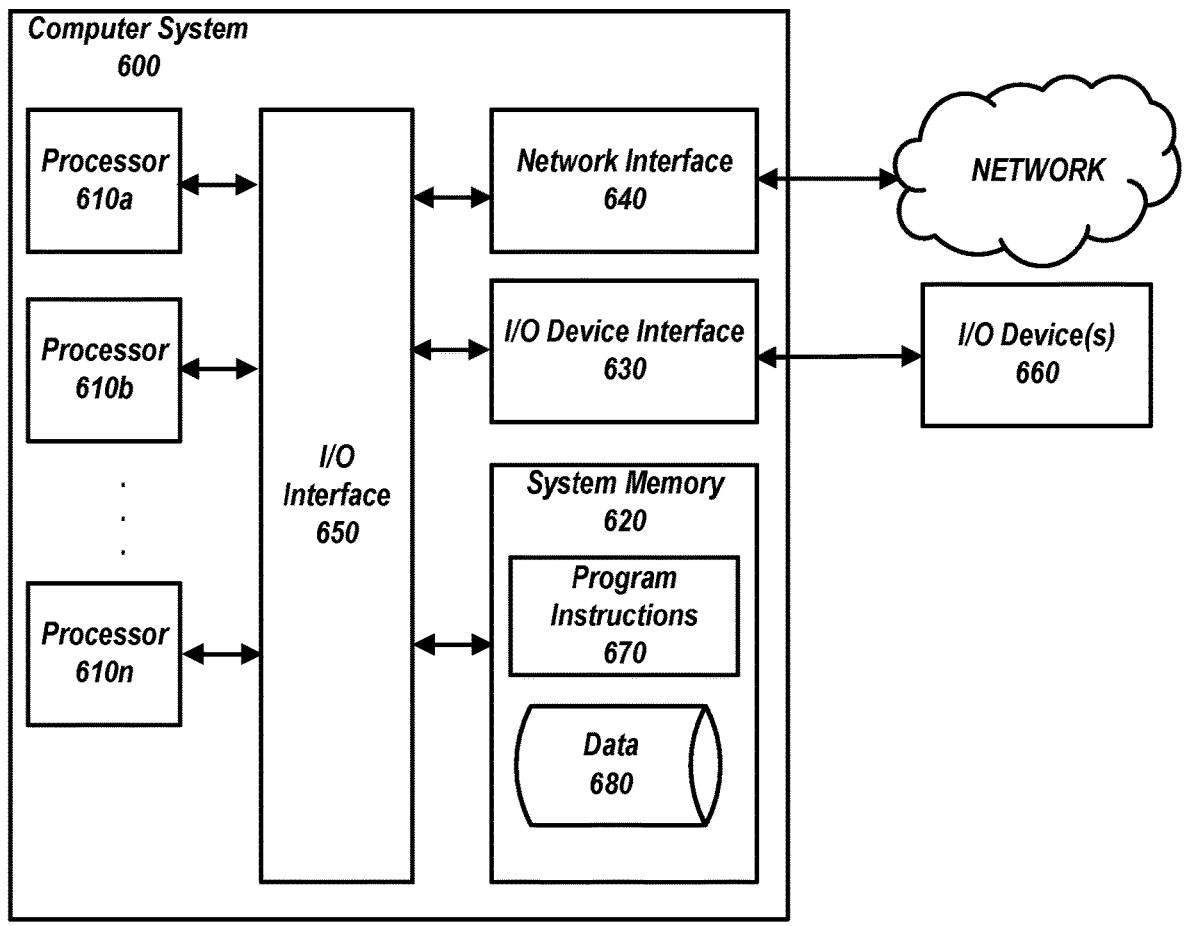
FIG. 6 illustrates a computing device, in accordance with one or more embodiments.

FIG. 6 shows an example computing system 600 that may be used in accordance with some embodiments of this disclosure. In some instances, computing system 600 is referred to as a computing system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
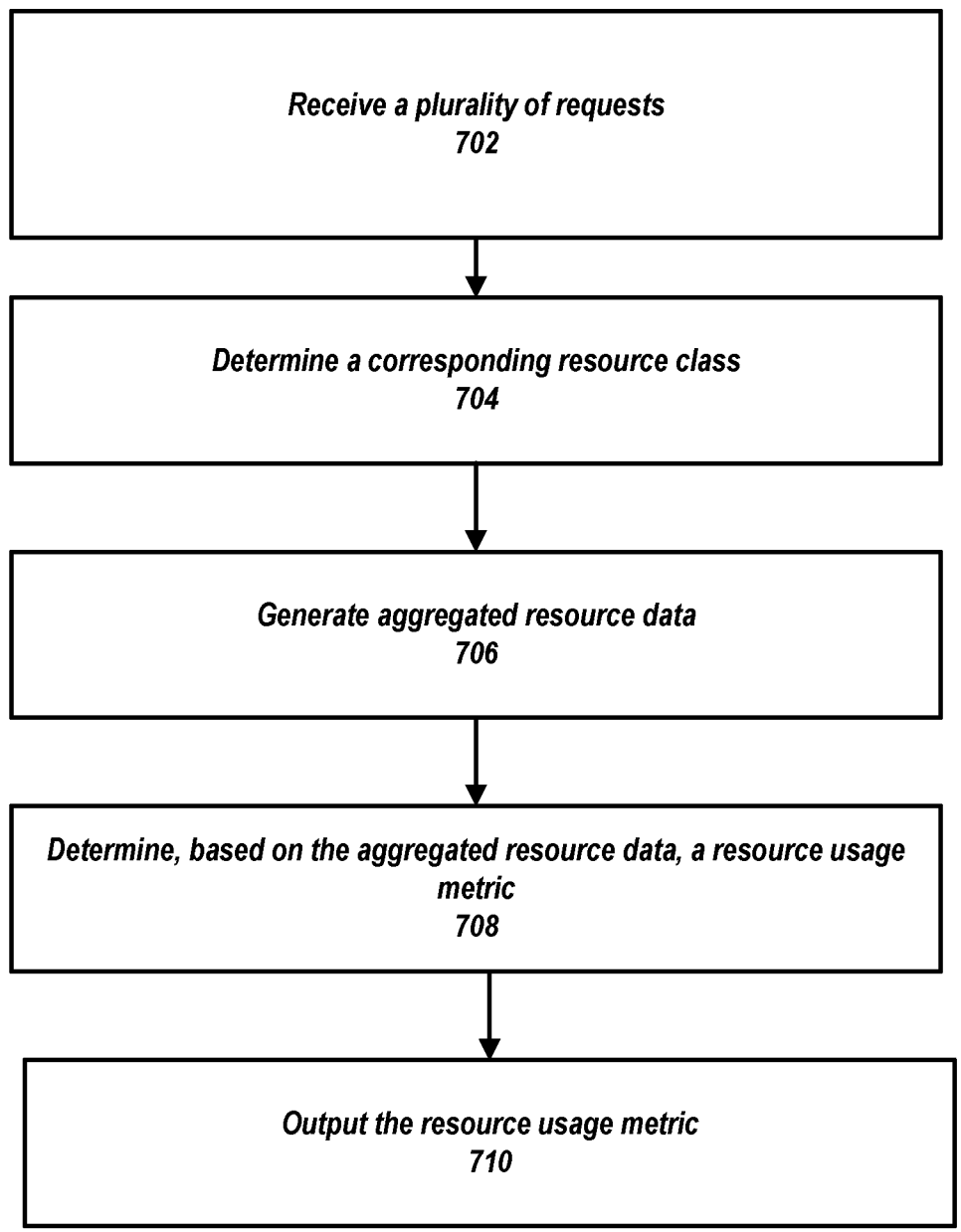
FIG. 7 shows a flowchart of the process for determining resource usage metrics for cloud computing systems, in accordance with one or more embodiments.

FIG. 7 shows a flowchart of the process 700 for determining resource usage metrics for cloud computing systems, in accordance with one or more embodiments. For example, the system may use process 700 (e.g., as implemented on one or more system components described above) in order to determine amounts of resources required to run a cloud computing system.

At step 702, process 700 (e.g., using one or more of processors 610a-610n) receives a plurality of requests. For example, computing system 600 may receive the requests via a network from I/O devices 660 or elsewhere. In some embodiments, the requests may be received from one or more remote computing devices (e.g., I/O devices 660). In some embodiments, each request may include a corresponding access token request and a corresponding resource class identifier.

At step 704, process 700 (e.g., using one or more of processors 610a-610n) determines, for each request of the plurality of requests received at step 702, a corresponding resource class. In some embodiments, this determination may be based on the corresponding resource class identifier.

In some embodiments, a particular resource class, or type of resources, may include servers, processors, storage, databases, networks, memory, power, applications, or other resource types, and each resource class may include multiple resources of the corresponding type. Each resource class may be associated with a corresponding resource class identifier. Resource class identifiers may be stored in system memory 620. Process 700 may determine, based on a resource class identifier included in a request, a resource class to which a remote computing device (e.g., I/O device 660) is requesting access.

At step 706, process 700 (e.g., using one or more of processors 610a-610n) generates aggregated resource data. In some embodiments, process 700 may generate the aggregated resource data based on a corresponding quantity of each resource. For example, process 700 may aggregate the quantities of each requested resource. In some embodiments, process 700 may aggregate data associated with each resource (e.g., type, quality, cost, timing, or other characteristics of each resource). In some embodiments, the resource data may be stored in system memory 620, data 680, or elsewhere in computing system 600. Process 700 may store the aggregated resource data in system memory 620, data 680, or elsewhere in computing system 600.

At step 708, process 700 (e.g., using one or more of processors 610a-610n) determines, based on the aggregated resource data, a resource usage metric. In some embodiments, the resource usage metric indicates a total amount of resources used by I/O devices 660. The resource usage metric may be in the form of a price, a price per user, an amount of each required resource, an amount of each required resource per user, or some other form.

At step 710, process 700 (e.g., using one or more of processors 610a-610n) outputs the resource usage metric. For example, process 700 may output the resource usage metric via I/O device interface 630. The output may include substitution information. In some embodiments, the output may include functionality to receive feedback from a user (e.g., via I/O device interface 630).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising generating a plurality of access tokens for an account, wherein the account is associated with a corresponding resource class of a plurality of resource classes, each resource class comprising a plurality of resources, receiving a plurality of requests, wherein each request of the plurality of requests comprises a corresponding access token request and a corresponding resource class identifier, determining, for each request of the plurality of requests based on the corresponding resource class identifier, the corresponding resource class, transmitting, according to the corresponding resource class, a plurality of access token responses to one or more computing devices, generating aggregated resource data based on a corresponding quantity of each resource, determining, based on the aggregated resource data, a resource usage metric, wherein the resource usage metric indicates a total amount of resources used, and outputting the resource usage metric.
2. The method of any one of the preceding embodiments, wherein generating the plurality of access tokens comprises retrieving an account identifier associated with the account, determining a number of resource classes within the plurality of requests, generating a plurality of sub-accounts equal to the number of the resource classes, and generating a token for each account of the plurality of sub-accounts.
3. The method of any one of the preceding embodiments, further comprising binding the plurality of access tokens to the plurality of resource classes by assigning the plurality of access tokens to the plurality of sub-accounts associated with the account, wherein each sub-account of the plurality of sub-accounts is associated with a resource class.
4. The method of any one of the preceding embodiments, further comprising in response to receiving a request of the plurality of requests, identifying a sub-account comprising one or more access tokens associated with the corresponding access token request, and accessing the one or more access tokens associated with the sub-account.
5. The method of any one of the preceding embodiments, wherein the plurality of resources within each resource class comprises a first resource and one or more substitution resources, wherein the one or more substitution resources may be substituted for the first resource within each resource class.
6. The method of any one of the preceding embodiments, further comprising in response to determining that the resource usage metric exceeds a threshold, retrieving a plurality of substitution resource identifiers associated with a resource class corresponding to the first resource, selecting, based on a substitution resource parameter not exceeding a threshold value, a substitution resource from the one or more substitution resources associated with the resource class, and in response to a request associated with the first resource, transmitting a response requesting a new request that includes an indication of the substitution resource.
7. The method of any one of the preceding embodiments, wherein generating the aggregated resource data comprises extracting, from each request of the plurality of requests, resource data relating to resources corresponding to each request, generating a resource requirement data structure comprising a plurality of entries, wherein each entry of the plurality of entries comprises the resource data from a corresponding request of the plurality of requests, and aggregating the plurality of entries within the resource requirement data structure.
8. The method of any one of the preceding embodiments, further comprising determining a number of users of the account, determining the aggregated resource data per user, wherein the aggregated resource data per user comprises a portion of the corresponding quantity of each resource, determining, based on the aggregated resource data per user, the resource usage metric per user, wherein the resource usage metric per user indicates an amount of resources used per user, and outputting the resource usage metric per user.
9. A tangible, non-transitory, machine-readable medium storing instructions that, when executed by a data processing apparatus, cause the data processing apparatus to perform operations comprising those of any of embodiments 1-8.
10. A system comprising one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

What is claimed is:

1. A system for determining resource usage metrics, the system comprising:
   one or more processors; and
   a non-transitory, computer-readable medium comprising instructions that when executed by the one or more processors cause operations comprising:
      generating a plurality of access tokens for an account, wherein the account is associated with a plurality of cloud computing resource classes, each cloud computing resource class comprising a plurality of resources;
      binding the plurality of access tokens to the plurality of cloud computing resource classes;
      receiving, from one or more remote computing devices, a plurality of requests, wherein each request comprises a corresponding access token request and a corresponding cloud computing resource class identifier;
      determining, for each request based on the corresponding cloud computing resource class identifier, a corresponding cloud computing resource class;
      transmitting, according to the corresponding cloud computing resource class, a plurality of access token responses to the one or more remote computing devices;
      storing, based on the plurality of requests, (1) a corresponding quantity of each resource of the plurality of resources and (2) a corresponding account identifier associated with the account;
      generating aggregated resource data based on the corresponding quantity of each resource;
      determining, based on the aggregated resource data, a resource usage metric, wherein the resource usage metric indicates a total amount of resources used; and
      outputting the resource usage metric.

2. The system of claim 1, wherein the plurality of resources within each cloud computing resource class comprises a first resource and one or more substitution resources, wherein the one or more substitution resources may be substituted for the first resource within each cloud computing resource class.

3. The system of claim 2, further comprising:
   in response to determining that the resource usage metric exceeds a threshold, retrieving a plurality of substitution resource identifiers associated with a cloud computing resource class corresponding to the first resource;
   selecting, based on a substitution resource parameter not exceeding a threshold value, a substitution resource from the one or more substitution resources associated with the cloud computing resource class; and
   in response to a request associated with the first resource, transmitting a response requesting a new request that includes an indication of the substitution resource.

4. The system of claim 2, wherein binding the plurality of access tokens to the plurality of cloud computing resource classes comprises assigning the plurality of access tokens to a plurality of sub-accounts associated with the account, wherein each sub-account of the plurality of sub-accounts is associated with a cloud computing resource class.

5. A method comprising:
   generating a plurality of access tokens for an account, wherein the account is associated with a corresponding resource class of a plurality of resource classes, each resource class comprising a plurality of resources;
   receiving a plurality of requests, wherein each request of the plurality of requests comprises a corresponding access token request and a corresponding resource class identifier;
   determining, for each request of the plurality of requests based on the corresponding resource class identifier, the corresponding resource class;
   transmitting, according to the corresponding resource class, a plurality of access token responses to one or more computing devices;
   generating aggregated resource data based on a corresponding quantity of each resource;
   determining, based on the aggregated resource data, a resource usage metric, wherein the resource usage metric indicates a total amount of resources used; and
   outputting the resource usage metric.

6. The method of claim 5, wherein generating the plurality of access tokens comprises:
   retrieving an account identifier associated with the account;
   determining a number of resource classes within the plurality of requests;
   generating a plurality of sub-accounts equal to the number of resource classes; and
   generating a token for each sub-account of the plurality of sub-accounts.

7. The method of claim 6, further comprising binding the plurality of access tokens to the plurality of resource classes by assigning the plurality of access tokens to the plurality of sub-accounts associated with the account, wherein each sub-account of the plurality of sub-accounts is associated with a resource class.

8. The method of claim 7, further comprising:
in response to receiving a request of the plurality of requests, identifying a sub-account comprising one or more access tokens associated with the corresponding access token request; and
accessing the one or more access tokens associated with the sub-account.

9. The method of claim 5, wherein the plurality of resources within each resource class comprises a first resource and one or more substitution resources, wherein the one or more substitution resources may be substituted for the first resource within each resource class.

10. The method of claim 9, further comprising:
in response to determining that the resource usage metric exceeds a threshold, retrieving a plurality of substitution resource identifiers associated with a resource class corresponding to the first resource;
selecting, based on a substitution resource parameter not exceeding a threshold value, a substitution resource from the one or more substitution resources associated with the resource class; and
in response to a request associated with the first resource, transmitting a response requesting a new request that includes an indication of the substitution resource.

11. The method of claim 5, wherein generating the aggregated resource data comprises:
extracting, from each request of the plurality of requests, resource data relating to resources corresponding to each request;
generating a resource requirement data structure comprising a plurality of entries, wherein each entry of the plurality of entries comprises the resource data from a corresponding request of the plurality of requests; and
aggregating the plurality of entries within the resource requirement data structure.

12. The method of claim 5, further comprising:
determining a number of users of the account;
determining the aggregated resource data per user, wherein the aggregated resource data per user comprises a portion of the corresponding quantity of each resource;
determining, based on the aggregated resource data per user, the resource usage metric per user, wherein the resource usage metric per user indicates an amount of resources used per user; and
outputting the resource usage metric per user.

13. A non-transitory, computer-readable medium, comprising instructions that, when executed by one or more processors, cause operations comprising:
generating a plurality of access tokens for an account, wherein the account is associated with a corresponding resource class of a plurality of resource classes, each resource class comprising a plurality of resources;
receiving a plurality of requests, wherein each request of the plurality of requests comprises a corresponding access token request and a corresponding resource class identifier;
determining, for each request of the plurality of requests based on the corresponding resource class identifier, the corresponding resource class;
transmitting, according to the corresponding resource class, a plurality of access token responses to one or more computing devices;
generating aggregated resource data based on a corresponding quantity of each resource;
determining, based on the aggregated resource data, a resource usage metric, wherein the resource usage metric indicates a total amount of resources used; and
outputting the resource usage metric.

14. The non-transitory, computer-readable medium of claim 13, wherein the instructions for generating the plurality of access tokens cause the one or more processors to perform operations comprising:
retrieving an account identifier associated with the account;
determining a number of resource classes within the plurality of requests;
generating a plurality of sub-accounts equal to the number of resource classes; and
generating a token for each sub-account of the plurality of sub-accounts.

15. The non-transitory, computer-readable medium of claim 14, wherein the instructions cause the one or more processors to perform operations comprising binding the plurality of access tokens to the plurality of resource classes by assigning the plurality of access tokens to the plurality of sub-accounts associated with the account, wherein each sub-account of the plurality of sub-accounts is associated with a resource class.

16. The non-transitory, computer-readable medium of claim 15, wherein the instructions cause the one or more processors to perform operations comprising:
in response to receiving a request of the plurality of requests, identifying a sub-account comprising one or more access tokens associated with the corresponding access token request; and
accessing the one or more access tokens associated with the sub-account.

17. The non-transitory, computer-readable medium of claim 13, wherein the plurality of resources within each resource class comprises a first resource and one or more substitution resources, wherein the one or more substitution resources may be substituted for the first resource within each resource class.

18. The non-transitory, computer-readable medium of claim 17, wherein the instructions cause the one or more processors to perform operations comprising:
in response to determining that the resource usage metric exceeds a threshold, retrieving a plurality of substitution resource identifiers associated with a resource class corresponding to the first resource;
selecting, based on a substitution resource parameter not exceeding a threshold value, a substitution resource from the one or more substitution resources associated with the resource class; and
in response to a request associated with the first resource, transmitting a response requesting a new request that includes an indication of the substitution resource.

19. The non-transitory, computer-readable medium of claim 13, wherein the instructions for generating the aggregated resource data cause the one or more processors to perform operations comprising:
extracting, from each request of the plurality of requests, resource data relating to resources corresponding to each request;
generating a resource requirement data structure comprising a plurality of entries, wherein each entry of the plurality of entries comprises the resource data from a corresponding request of the plurality of requests; and aggregating the plurality of entries within the resource requirement data structure.

20. The non-transitory, computer-readable medium of claim 13, wherein the instructions cause the one or more processors to perform operations comprising:
determining a number of users of the account;
determining the aggregated resource data per user, wherein the aggregated resource data per user comprises a portion of the corresponding quantity of each resource;
determining, based on the aggregated resource data per user, the resource usage metric per user, wherein the resource usage metric per user indicates an amount of resources used per user; and
outputting the resource usage metric per user.

* * * * *